US007840661B2

(12) United States Patent
Kalaboukis et al.

(10) Patent No.: US 7,840,661 B2
(45) Date of Patent: Nov. 23, 2010

(54) CREATING AND EDITING MEDIA OBJECTS USING WEB REQUESTS

(75) Inventors: Chris T. Kalaboukis, Los Gatos, CA (US); Ron Martinez, San Francisco, CA (US); Ryan B. Cunningham, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 270 days.

(21) Appl. No.: 11/966,934

(22) Filed: Dec. 28, 2007

(65) Prior Publication Data

US 2009/0172197 A1    Jul. 2, 2009

(51) Int. Cl.
G06F 15/173    (2006.01)
(52) U.S. Cl. ...................................... 709/223
(58) Field of Classification Search ......... 709/217–219, 709/246, 223
See application file for complete search history.

(56) References Cited

U.S. PATENT DOCUMENTS

| 5,307,456 | A |  | 4/1994 | MacKay |
| 5,519,828 | A |  | 5/1996 | Rayner |
| 5,826,102 | A |  | 10/1998 | Escobar et al. |
| 5,852,435 | A |  | 12/1998 | Vigneaux et al. |
| 5,884,056 | A | * | 3/1999 | Steele ........................ 715/738 |
| 6,029,194 | A |  | 2/2000 | Tilt |
| 6,339,785 | B1 | * | 1/2002 | Feigenbaum ................ 709/213 |
| 6,615,212 | B1 |  | 9/2003 | Dutta et al. |
| 6,618,758 | B1 | * | 9/2003 | Ubowski ..................... 709/232 |
| 6,628,303 | B1 |  | 9/2003 | Foreman et al. |
| 6,711,741 | B2 | * | 3/2004 | Yeo ............................. 725/87 |
| 6,870,547 | B1 |  | 3/2005 | Crosby et al. |
| 6,976,028 | B2 |  | 12/2005 | Fenton et al. |
| 7,062,567 | B2 | * | 6/2006 | Benitez et al. .............. 709/231 |
| 7,073,127 | B2 |  | 7/2006 | Zhao et al. |
| 7,107,351 | B2 | * | 9/2006 | Baumeister et al. ......... 709/231 |
| 2002/0116716 | A1 |  | 8/2002 | Sideman |
| 2002/0118300 | A1 |  | 8/2002 | Middleton et al. |
| 2002/0143782 | A1 |  | 10/2002 | Headings et al. |
| 2003/0158928 | A1 |  | 8/2003 | Knox et al. |

(Continued)

OTHER PUBLICATIONS

Adobe. (2007). "Adobe Flash Player Version Penetration," located at <http://www.adobe.com/products/player_census/flashplayer/version_penetration.html>, last visited on May 16, 2007. (2 pages).

(Continued)

*Primary Examiner*—Hussein A Elchanti
(74) *Attorney, Agent, or Firm*—James J. DeCarlo; Greenberg Traurig, LLP

(57) ABSTRACT

A computer-readable medium, apparatus, and interface are provided for constructing an edit decision list that specifies media content to be included in a composed media object. The edit decision list is constructed by generating at least one media portion specifier, wherein the at least one media portion specifier identifies at least a portion of at least one first media object, and generating the edit decision list, where the edit decision list includes a network address and the at least one media portion specifier, and the edit decision list is in the form of a network resource locator string, such as a URL, suitable for transmission in a network request to the network address to cause the composed media object to be generated. The edit decision list may be transmitted in a single Hypertext Transfer Protocol request to the network address.

40 Claims, 6 Drawing Sheets

U.S. PATENT DOCUMENTS

| | | |
|---|---|---|
| 2003/0236886 A1 | 12/2003 | Oren et al. |
| 2004/0128317 A1 | 7/2004 | Sull et al. |
| 2004/0179740 A1 | 9/2004 | Yasuhiro |
| 2005/0060422 A1 | 3/2005 | Rudolph et al. |
| 2005/0198018 A1 | 9/2005 | Shibata et al. |
| 2005/0228819 A1 | 10/2005 | Richards et al. |
| 2006/0156219 A1 | 7/2006 | Haot et al. |
| 2007/0179979 A1 | 8/2007 | Folgner et al. |
| 2008/0016245 A1 | 1/2008 | Cunningham et al. |

OTHER PUBLICATIONS

International Preliminary Report on Patentability mailed on Oct. 14, 2008 for PCT Application No. PCT/US2007/008917, filed on Apr. 9, 2007, 8 pages.

International Search Report and Written Opinion mailed on Oct. 2, 2007, for PCT Application No. PCT/US2007/008917 filed Apr. 9, 2007, 15 pages.

International Search Report and Written Opinion mailed on Sep. 28, 2007, for PCT Application No. PCT/US2007/008914 filed Apr. 9, 2007, 11 pages.

International Search Report and Written Opinion mailed on Feb. 14, 2008, for PCT Application No. PCT/US2007/08917 filed Apr. 9, 2007, 10 pages.

One True Media, Inc. (2007). "Beyond Slideshows, Dazzle Your Friends with Amazing Photo and Video Montages," located at <http://www.onetruemedia.com>, last visited on May 16, 2007. (2 pages).

U.S. Appl. No. 11/622,920, filed Jan. 12, 2007, by Folgner et al.
U.S. Appl. No. 11/622,938, filed Jan. 12, 2007, by Folgner et al.
U.S. Appl. No. 11/622,948, filed Jan. 12, 2007, by Folgner et al.
U.S. Appl. No. 11/622,957, filed Jan. 12, 2007, by Folgner et al.
U.S. Appl. No. 11/622,962, filed Jan. 12, 2007 by Folgner et al.
U.S. Appl. No. 11/622,968, filed Jan. 12, 2007, by Folgner et al.

* cited by examiner

CREATING AND EDITING MEDIA OBJECTS USING WEB REQUESTS

RELATED APPLICATIONS

The present application is related to U.S. patent application Ser. Nos. 11/784,843, 11/784,918, 11/786,016, and 11/786,020, filed on Apr. 9, 2007, and U.S. patent application Ser. No. 11/854,369, filed on Sep. 12, 2007, all of which are hereby incorporated by reference herein in their entirety.

BACKGROUND

1. Field

The present application relates generally to creation and editing of media objects, and more specifically to creation and editing of media objects over a network using Web requests.

2. Related Art

Video editors and edit decision lists for representing videos spliced together from other videos are known in the art. Edit decision lists indicate sequences of media, durations, transitions, and other information which may be interpreted by a video editor to piece together a media sequence that can be rendered and viewed at a later time. Such approaches to the edit decision list assume that complex client devices and applications are available, and the applications typically use proprietary formats for the edit decision lists. Such edit decision lists may be stored in a database, and are stored in proprietary formats that are specific to a particular video editors or applications.

Mobile devices often do not have sufficient computing power or network bandwidth for running existing video editors or applications well. However, users may still wish to edit video or other media content on a device with a small screen and/or relatively little computing power, such as a mobile device or cell phone, or on a web page. Furthermore, users are increasingly remixing or recombining media from multiple sources to create new works. It would be desirable, therefore, to be able to create and manipulate videos and other media objects on smaller devices with less network bandwidth, or with less computational resource requirements than traditional video editors and applications.

SUMMARY

In general, in a first aspect, the invention features a computer-readable medium comprising instructions for generating an edit decision list that specifies media content to be included in a composed media object, the instructions for generating at least one media portion specifier, where the at least one media portion specifier identifies at least a portion of at least one first media object, generating the edit decision list, where the edit decision list includes a network address and the at least one media portion specifier, and the edit decision list is in the form of a network resource locator string suitable for transmission in a network request to the network address to cause the composed media object to be generated.

Embodiments of the invention may include one or more of the following features. The medium may further include instructions for transmitting a single Hypertext Transfer Protocol request to the network address, where the request includes the edit decision list in a resource specifier. The network resource locator may include a Uniform Resource Locator, Uniform Resource Identifier, Uniform Resource Name, or a combination thereof. The network request may be selected from the group consisting of a Hypertext Transfer Protocol request message, a web service request message, and a Real-Time Messaging Protocol message. The at least one media portion specifier may include a media object identifier that identifies the at least one first media object. The at least one media portion specifier may include a start time that identifies a position of the start of the at least one media portion in the composed media object relative to the beginning of the composed media object. The at least one media portion specifier may include a begin time that identifies a begin time of the at least one media portion in the at least one first media object relative to the beginning of the first media object. The at least one media portion specifier may include an end time that identifies an end time of the at least one media portion in the at least one first media object relative to the beginning of the first media object.

The at least one media portion specifier may include at least one option specifier, where the at least one option specifier specifies a modification to be applied to the at least one media portion. The at least one option specifier may include a volume level specifier. The edit decision list may include an action specifier that specifies an action to be included in the composed media object, where a time at which the action occurs in the composed media object is based on a position of the action specifier in the edit decision list. The action may include a transition. The edit decision list may include at least one bundle definition, where the bundle definition includes a name and at least one replacement edit decision list to be associated with the name, where the name is to be replaced with the at least one replacement edit decision list in response to translation of at least one subsequent edit decision list to at least one composed media object.

The edit decision list may include at least one bundle name, where the bundle name is to be replaced with at least one replacement edit decision list when the composed media object is generated. The edit decision list may include at least one embedded network resource locator, and the embedded network resource locator is to be translated to at least one replacement edit decision list referred to by the embedded network resource locator when the composed media object is generated. The edit decision list may include at least one macro name, the at least one macro name identifies at least one macro definition, and the macro name is to be replaced with the macro definition when the composed media object is generated. The at least one media portion specifier may include at least one search string, the at least one search string to be used with a search engine to select the at least one first media object based upon results of a web search. The at least one first media object may be selected from at least one search result generated by the search engine for the at least one search string.

In general, in a second aspect, the invention features a computer-readable medium comprising instructions for generating media content to be included in a composed media object, the instructions for receiving a request from a network client, where the request includes an edit decision list, and the edit decision list includes at least one media portion specifier, extracting the at least one media portion specifier from the edit decision list, where the at least one media portion specifier identifies at least a portion of at least one first media object, and generating the composed media object, where the composed media object includes the at least a portion of at least one first media object.

Embodiments of the invention may include one or more of the following features. The edit decision list may be received in a single Hypertext Transfer Protocol request that includes the edit decision list in a resource specifier. The medium may further comprise instructions for extracting a media object identifier from the at least one media portion specifier, selecting the at least one first media object based upon the media object identifier, and including the at least a portion of at least one first media object in the composed media object. The medium may further comprise instructions for appending the at least a portion of at least one first media object to the composed media object if no start time is specified in the at least one media portion specifier. The medium may further comprise instructions for extracting a specified start time from the at least one media portion specifier, and including the at least a portion of at least one first media object in the composed media object at the specified start time in the composed media object relative to the beginning of the composed media object.

The medium may further comprise instructions for extracting a specified begin time from the at least one media portion specifier, and including the at least a portion of at least one first media object in the composed media object, where the at least a portion of at least one first media object begins at the specified begin time in the at least one first media object relative to the beginning of the at least one first media object. The medium may further comprise instructions for extracting a specified end time from the at least one media portion specifier, and including the at least a portion of at least one first media object in the composed media object, where the at least a portion of at least one first media object ends at the specified end time in the at least one first media object relative to the beginning of the first media object. The medium may further comprise instructions for extracting at least one option specifier from the at least one media portion specifier, and applying the at least one option specifier to the composed media object.

The at least one option specifier may include a volume level specifier, and applying the at least one option specifier comprises setting a volume level of the composed media object based upon the volume level specifier. The medium may further comprise instructions for extracting at least one action specifier from the edit decision list, and including at least one action effect in the composed media object, where the at least one action effect is based upon the at least one action specifier, and a time at which the at least one action effect occurs in the composed media object is based upon a position of the at least one action specifier in the edit decision list. The action effect may include a transition. The transition may be selected from the group consisting of a wipe right action, a wipe left action, a wipe top action, and a title action.

The medium may further comprise instructions for extracting at least one bundle definition from the edit decision list, where the at least one bundle definition includes at least one bundle name and at least one additional edit decision list, and storing the at least one bundle name in association with the at least one additional edit decision list. The medium may further comprise instructions for extracting at least one bundle name from the edit decision list, retrieving at least one additional edit decision list based upon the at least one bundle name, and processing the at least one additional edit decision list as part of the edit decision list. The medium may further comprise instructions for extracting at least one network resource locator from the edit decision list, retrieving at least one replacement edit decision list based upon the network resource locator, and processing the at least one replacement edit decision list as part of the edit decision list. The medium may further comprise instructions for extracting at least one macro name from the edit decision list, selecting at least one macro definition based on the at least one macro name, and processing the at least one macro definition as part of the edit decision list.

The medium may further comprise instructions for extracting at least one search string from the at least one media portion specifier, invoking a search engine to locate at least one search result based upon the search string, selecting at least one specified media object based upon the at least one search result, and including the at least one specified media object in the composed media object. The medium may further comprise instructions for retrieving at least one stored string from a computer memory, where the at least one stored string is associated with an attribute that specifies at least one position in the edit decision list to which the at least one stored string is to be added, and processing the at least one stored string as a component of the edit decision list that begins at the at least one position in the edit decision list.

In general, in a third aspect, the invention features a computer-readable medium comprising instructions for allocating consideration received in exchange for a media object to at least one rights holder of at least one portion of the media object, the instructions for receiving an edit decision list that specifies a media object, where the edit decision list comprises at least one media portion specifier, and allocating the consideration to at least one rights holder, where the at least one rights holder is associated with the at least one media portion specifier, and the consideration is allocated in proportion to a length of the at least one portion of the media object.

In general, in a fourth aspect, the invention features an interface for generating an edit decision list, the interface comprising a palette component for providing for display and user selection at least one action command, at least one clip, or a combination thereof, a media object representation component that includes a representation of a media object as at least one segment and at least one action command, where the media object representation component is operable to add the at least one clip to the representation of the media object in response to user selection of the at least one clip, and further operable to add the at least one action to the representation of the media object in response to user selection of the at least one action, and a result component for displaying a string that represents the media object as an edit decision list in a network resource locator format. Embodiments of the invention may include one or more of the following features. The network resource locator format may include a Uniform Resource Locator format, a Uniform Resource Identifier format, a Uniform Resource Name format, or a combination thereof. The interface may further include an add advertising component for adding the at least one clip to the representation of the media object in response to user selection of the add advertising component, where the at least one clip comprises an advertisement.

In general, in a fifth aspect, the invention features an apparatus for generating an edit decision list that specifies media content to be included in a composed media object, the apparatus including logic for generating at least one media portion specifier, where the at least one media portion specifier identifies at least a portion of at least one first media object, and logic for generating the edit decision list, where the edit decision list includes a network address and the at least one media portion specifier, where the edit decision list is in the form of a network resource locator string suitable for transmission in a network request to the network address to cause the composed media object to be generated. Embodiments of the invention may include one or more of the following features. The apparatus may further include logic for transmitting a single Hypertext Transfer Protocol request to the network address, where the request includes the edit decision list in a resource specifier. The network resource locator may include a Uniform Resource Locator, Uniform Resource Identifier, Uniform Resource Name, or a combination thereof. The at least one media portion specifier may include a media object identifier that identifies the at least one first media object. The at least one media portion specifier may include a begin time that identifies a begin time of the at least one media portion in the at least one first media object relative to the beginning of the first media object. The edit decision list may include an action specifier that specifies an action to be included in the composed media object, where a time at which the action occurs in the composed media object is based on a position of the action specifier in the edit decision list.

In general, in a sixth aspect, the invention features an apparatus for generating media content to be included in a composed media object, the apparatus including logic for receiving a request from a network client, where the request includes an edit decision list, and the edit decision list includes at least one media portion specifier, logic for extracting the at least one media portion specifier from the edit decision list, where the at least one media portion specifier identifies at least a portion of at least one first media object, and logic for generating the composed media object, where the composed media object includes the at least a portion of at least one first media object.

Embodiments of the invention may include one or more of the following features. The edit decision list may be received in a single Hypertext Transfer Protocol request that includes the edit decision list in a resource specifier. The apparatus may further include logic for extracting a media object identifier from the at least one media portion specifier, logic for selecting the at least one first media object based upon the media object identifier, and logic for including the at least a portion of at least one first media object in the composed media object. The apparatus may further include logic for appending the at least a portion of at least one first media object to the composed media object if no start time is specified in the at least one media portion specifier.

The apparatus may further include logic for extracting a specified begin time from the at least one media portion specifier, and logic for including the at least a portion of at least one first media object in the composed media object, where the at least a portion of at least one first media object begins at the specified begin time in the at least one first media object relative to the beginning of the at least one first media object. The apparatus may further include logic for extracting at least one action specifier from the edit decision list, and logic for including at least one action effect in the composed media object, where the at least one action effect is based upon the at least one action specifier, and a time at which the at least one action effect occurs in the composed media object is based upon a position of the at least one action specifier in the edit decision list.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
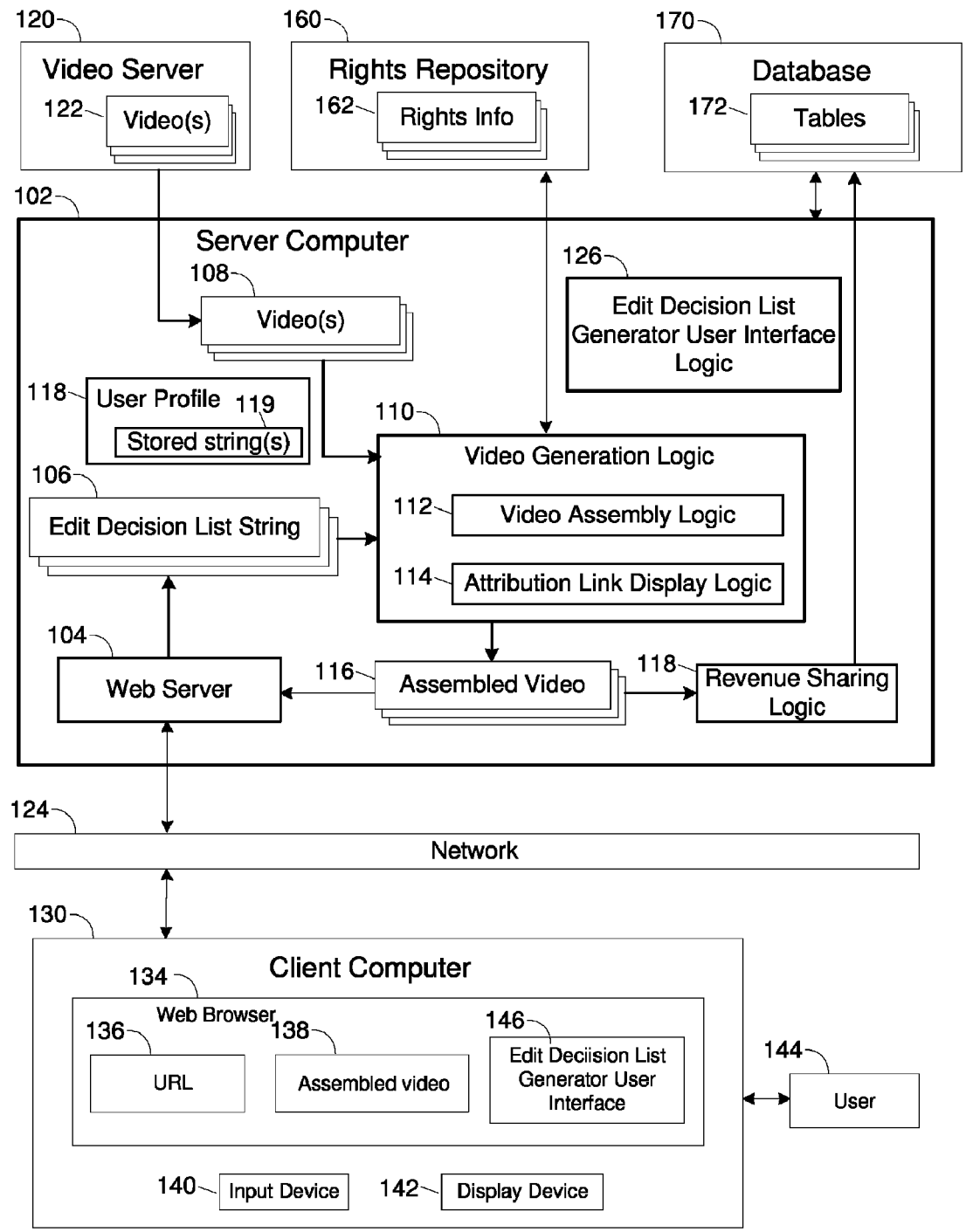
FIG. 1 illustrates a server-based a system for generating a video in response to a request for a URL that contains an edit decision list in accordance with embodiments of the invention.

FIG. 1 illustrates a server-based a system for generating a video in response to request for a URL that contains an edit decision list in accordance with embodiments of the invention. A server computer 102 receives requests for objects such as web pages via a network 124. Each request may be, for example, a Hypertext Transfer Protocol (HTTP) request or a Real-Time Messaging Protocol (RTMP) request. RTMP is a protocol developed by Adobe® Systems Incorporated of San Jose, Calif. for streaming media over a network such as the Internet. The requests may be generated and sent via the network 124 by a client computer 130. In one example, a web browser may receive a URL 136 in an HTTP request from a user 144 and transmit the URL 136 to a web server 104 located on the server 102 via the network 124.

In one example, the web server 102 receives an HTTP request, and video generation logic receives the resource specifier of the URL that was transmitted to the server 102 in the HTTP request. The resource specifier is the portion of the URL after the hostname, and begins with "splice?" for the example URL's described herein. The string "splice?" identifies the resource specifier as an edit decision list. A server may invoke edit decision list processing upon receiving a resource specifier that begins with "splice?". Any other string may be used instead of "splice?" as long as the sender (e.g., web client) and receiver (e.g., web server) agree on the same string, so that the receiver may recognize the string as an edit decision list. In one example, the resource specifier of the URL is received by the HTTP server as the first line of the HTTP request, also known as the status line. For example, when a Web browser requests a URL http://www.search.com/, the following HTTP GET request message is generated:

GET/index.html HTTP/1.1

Host: www.search.com

The portion of the first line between the GET and HTTP/1.1 corresponds to the resource specifier. In this example, the resource specifier is "/index.html". With reference to the URL/URI, the resource specifier is essentially the portion of the URL/URI after the host name.

The video generation logic 110 parses, i.e., extracts, an edit decision list string from the resource specifier. The resource specifier is in the form of an edit decision list string and specifies instructions for creating an assembled, i.e., composed, video 118 by referring to one or more video clips, with optional parameters for each video clip that specify the configuration or placement of the video clip(s) in the assembled video 118. The edit decision list string 106 may also specify effects and other actions to be included in the assembled video. An example edit decision list string is clip1[1.2:5.9]clip2[1.7]:wiperight:clip7[ ], which specifies that three video clips are to be combined to generate a composed media object, which is a video in this example. In one example, the clips and composed media object are media assets. The clips are identified by media object identifiers, e.g., clip 1, which are names or numbers that are recognized by a video content server or database. In this example, clip 1, clip2, and clip7 refer to video clips stored in the video content server. The example string specifies that a portion of clip1 starting at 1.2 seconds and ending at 5.9 seconds from the beginning (i.e., from time 0) of clip1 is to be the first part of the composed video, and a portion of clip2 starting at 1.7 seconds and continuing until the end of clip2 is to be the second part of the composed video, beginning immediately after the end of clip1. The command "wiperight" indicates that a wipe right transition effect is to be shown between clip2 and clip7, and finally, clip7 is to be displayed in its entirety. Note that times may be included or omitted from the brackets after the clip name. If a time is excluded, then a default will be chosen, e.g., if a start time is excluded, then the start time will be 0; if an end time is excluded, then the end time will be the end of the clip, and if both are excluded, then the entire clip will be added to the composed video. A composed video may be created by submitting the edit decision list as a web request URL in the address bar of a web browser. In this example, the video composed of clip1, clip2, and clip7 may be requested by submitting the following URL in a web browser's address bar:

http://video.site.com/splice?clip1[1.2:5.9]clip2[1.7]:wiperight:clip7[ ]

An HTTP request message (or, in other examples, a request message in another protocol) would be generated and transmitted to the host video.site.com. The request message would have the following content:

GET/splice?clip1[1.2:5.9]clip2[1.7]:wiperight:clip7[ ]HTTP/1.1

Host: www.video.site.com

The edit decision list string is therefore transmitted to the HTTP server as the resource specifier in the HTTP GET request. The server receives the HTTP GET request, extracts the edit decision list string, and parses the string into clip identifiers, options, actions, and other entities as described herein. The server then generates the composed video and returns the composed video to the client as a response, e.g., in an HTTP response message. The composed video may be streamed to the client. In other examples, the composed video may be stored in a database for later retrieval, and an identifying value, such as a new clip identifier, may be returned to the client in the HTTP response message.

In one example, video generation logic 110 receives the edit decision list string 106 and generates an assembled video 110. The video generation logic 110 includes video assembly logic 112 and attribution link display logic 114. The video assembly logic 112 extracts substrings from the edit decision list string 106 and retrieves video clips 108 referred to by the substrings from a database 120 of videos 122. The process of parsing the edit decision list string to extract the individual components is further described elsewhere herein.

The video generation logic 110 may consult a rights repository 160 to determine if a user who sent the edit decision list string has permission to retrieve the video clips 108. If the user does not have permission to retrieve one or more of the video clips, then the request for the video clips will be denied, e.g., an error message will be displayed, and no assembled video 116 will be generated or returned to the user. In one example, the rights may be checked on every request to convert the edit decision list string to an assembled video. In one example, the assembled video may be returned to the user as an HTTP response that streams the video to the client computer 130. In another example, the assembled video may be stored in a database 170 and a reference that can be used for later retrieval of the stored video may be returned in an HTTP response. Note that although video is used in the example of FIG. 1, the techniques described herein may be applied to other types of media objects or media content, including images, transitions, effects, and audio.

The rights repository 160 may be, for example, a database that stores rights information 162. The rights information 162 may be a table that associates users with videos 122 stored in the video server 120. A user may receive rights to a video by paying the owner of the video or providing some other legal consideration to the owner for rights to display the video(s) 108.

In one example, attribution link display logic 114 adds an attribution link to the assembled video 116. The attribution link may be, for example, a Web link that identifies a web site of the owner of the video 108.

In one example, the server 102 also includes revenue sharing logic 118 for allocating revenue, e.g., advertising revenue, to the users who contributed videos 108 to an assembled video 116. If revenue is received for an assembled video 116, the revenue sharing logic 118 may transfer funds or other consideration from an account of the user 144 to an account of the owner of the rights to the video(s) 108. The revenue sharing logic 118 may retrieve information about the owner of the rights from a database 170. When the assembled video 116 includes videos 108 owned by more than one owner (e.g., person or company) the revenue sharing logic 118 may allocate a percentage of the revenue to each owner in an amount based upon the length of the video(s) 108 provided by that corresponding owner, or upon a factor or formula associated with the owner.

In one example, a user profile 118 is stored in a memory of the server computer 102 and/or the database 170. The user profile 118 includes information such as a user's name, preferences, and other data associated with the user. The user profile may include one or more stored edit decision lists, referred to herein as stored strings 119, which may be retrieved by the video generation logic 110 when a video is generated. The video generation logic 110 may add (i.e., prepend, append, insert) the one or more stored strings 119 to the edit decision list string 106 before converting the string 106 to a video or other media object. The position, i.e., beginning, middle (with a further specification to indicate the specific location), or end, in the edit decision list string 106 at which the stored string 119 is added may be specified in an attribute name of the stored string 119, or in another stored string associated with the stored string 119. The position may be specified directly, e.g., as a numeric index, or indirectly, e.g., as a code indicating one or more positions in the edit decision list 106 based upon time, the content of the edit decision list 106, or external variables such as the user profile 118, the time of day, the identity of the rights holder, and the like. An example direct position specifications would be "Begin" for the beginning of the edit decision list 106. Example indirect position specifications would be "every 8 minutes", "at random times", or "after the first clip" to add the stored string 119 to the edit decision list 106 at the described times.

In one example, the video generation logic 110 does not modify the edit decision list string 106 or create a new string based on the edit decision list string 106, but processes the stored string 119 before, during, or after processing the edit decision list string 106, according to attributes or type information associated with the stored string 119. For example, a stored string 119 may be stored in the user preferences with an associated name URL_EDL_Begin, and the video generation logic 110 may retrieve a stored string 119 associated with the name URL_EDL_Begin, and prepend the stored string 119 to the edit decision list string 106, or process the stored string 119 before processing the edit decision list string 106. Similarly, a stored string 119 may be associated in the user profile 118 with the name URL_EDL_End, and the video generation logic 110 may retrieve a stored string 119 with the name URL_EDL_End and append the stored string 119 to the edit decision list 106, or process the stored string 119 after processing the edit decision list string 106. Therefore a user may store edit decision list instructions that are frequently used in videos, and the stored strings will be processed as if they had been part of the edit decision list string 106. For example, the string "/t:A Yahoo! Production" may be stored in the user profile with the name URL_EDL_Begin, and the string "wipeleft:/t:The End" may be stored in the user profile with the name URL_EDL_End. The attribute names include Begin and End to indicate that the associated stored string 119 is to be added to or processed at the beginning and end, respectively, of the edit decision list string 106. In one example, for the middle position indicator, the position at which the stored string 119 is to be added or processed may be specified by a number, e.g., a character index or word index (where words are separated by colons or some other separator character), or by string, e.g., a string such as "before first wiperight" or "every 8 minutes" or "three times evenly distributed" or "after every segment."

The server 102 also includes edit decision list generator user interface logic 126 for providing a user interface for generating edit decision lists. The user interface is described in more detail below with respect to FIG. 5. The edit decision list generator user interface logic 126 may be, for example, a server page, widget code, or JavaScript™ program code that executes on the server 102 and/or client 130 to present a user interface on the client computer 120. The server 102 may provide user interface components, e.g., HTML pages, JavaScript™ components, widgets implemented in JavaScript™ or another programming language by making the user interface components available to the client 130. The server 102 may transmit the user interface components to the client via a computer network. The client 130 may receive all or a portion of the edit decision list generator user interface logic 126 from the server, and may present a user interface 146 of the logic 126 to the user 144 to assist the user in creating edit decision lists. The logic 126 generates an edit decision list string 106 that the user can retrieve and use by, for example, performing a clipboard copy on the edit decision list string displayed in the user interface 146.

In one example, an edit decision list URL may include at least one media portion specifier, where the media portion specifier identifies at least a portion of a media object. An example media portion specifier is clip1[2.5~3.1:4.2+7]. The edit decision list is in the form of a network resource locator string suitable for transmission in a network resource locator portion of a single network request to the network address to cause the composed media object to be generated. Although the term URL is used herein for descriptive purposes, including in the name "edit decision list URL", the network resource locator may be a Uniform Resource Locator, Uniform Resource Identifier, Uniform Resource Name, or any combination of a network address and a string representation of an edit decision list. In some examples, the network resource locator is transmitted in a single request, i.e., one network message. The network message may be, for example, a Hypertext Transfer Protocol (HTTP) request message, a Real-Time Messaging Protocol (RTMP) message, or a web service request message, such as a SOAP request. Similarly, when a server or receiving computer receives the network request, the composed media object is generated in response to a single request. However, in some examples, the single request may be preceded by additional requests that define information such as macros or bundles, as described herein. In such cases, the composed media object is still created in response to a single request, where the single request refers to information, such as macros and bundles, defined in previous requests.

The media portion specifier may include a media object identifier that identifies the first media object. The media object identifier may be a string, such as "clip1", or a number, such as 12345, or a GUID, or any value of bounded length. The network address may be a numeric Internet protocol address or an Internet host name. The media portion specifier may include a start time that identifies a position of the start of the media portion in the composed media object relative to the beginning of the composed media object. The media portion specifier may include a begin time that identifies a begin time of the media portion in the first media object relative to the beginning of the first media object. The media portion specifier may also include an end time that identifies an end time of the media portion in the first media object relative to the beginning of the first media object. The media portion specifier may include an option specifier that specifies a modification to be applied to the media portion. The option specifier may specify a volume, e.g., as +50 for 50% volume.

The edit decision list may include an action specifier that specifies an action to be included in the composed media object, where a time at which the action occurs in the composed media object is based on a position of the action specifier in the edit decision list. The action specifier may be any type of transition, such as, for example, a wipe right action, a wipe left action, a wipe top action, and a title action. The action may be a visual effect, a title, an image, or a combination thereof.

The edit decision list may include a bundle definition that includes a name and a replacement edit decision list to be associated with the name, where the name is to be replaced with the replacement edit decision list when a subsequent edit decision list is translated to a composed media object. The edit decision list may include a bundle name to be replaced with a replacement edit decision list when the composed media object is generated. The bundle feature allows for edit decision lists to be constructed in excess of URL length limits, such as a 2048 character limit imposed by web browsers and/or web servers.

In one example, the edit decision list includes a network resource locator, e.g., an embedded URL, where the network resource locator is to be translated to at least one replacement edit decision list referred to by the network resource locator when the composed media object is generated. The edit decision list may include a macro name that identifies at least one macro definition, where the macro name is to be replaced with the macro definition when the composed media object is generated. The media portion specifier may include a search string, the search string to be used with a search engine to select the first media object based upon results of a web search. The search string is submitted to a search engine, and one or more of the search results are used as the media object In one example, a composed media object is generated based upon an edit decision request in response to receiving the edit decision from a client computer, where the edit decision list includes at least one media portion specifier. A media portion specifier is read, i.e., extracted, from the edit decision list, and the media portion specifier identifies at least a portion of a media object. The composed media object is generated by combining the media objects represented by the media portion specifiers and other information in the edit decision list string. One or more media object identifier(s), start time(s), begin time(s), end time(s), option(s), action(s), macro(s), bundle(s), and URL(s) are extracted from the edit decision request and added to or applied to the composed media object.

A specified start time may be extracted from the media portion specifier; and a portion of a media object may be included in the composed media object at the specified start time relative to the beginning of the composed media object. "Including" a portion of a media object refers to appending the media object to the composed media object or splicing (i.e., inserting) the media object into the composed media object. The composed media object may include the portion of the media object by value, i.e., there may be a single composed media object that includes the media object, or by reference, e.g., the composed media object may have a reference to the portion of the media object.

Example techniques for processing an edit decision list will now be described. The term "processing" refers to the process of generating an assembled video 108 from an edit decision list string 106. In one example, a specified begin time may be extracted from the media portion specifier; and a selected portion of the at least a portion of media object may be included in the composed media object, where the selected portion begins at the specified begin time in the first media object relative to the beginning of the first media object. A specified end time may be extracted from the media portion specifier; and the selected portion of the at least a portion of the media object may be included in the composed media object, where the selected portion ends at the specified end time in the first media object relative to the beginning of the first media object.

In one example, an option specifier may be extracted from the media portion specifier and applied to the composed media object to modify presentation attributes of the composed media object. The option specifier may be a volume level specifier, and applying the option specifier may include setting a volume level attribute of the composed media object based upon the volume level specifier.

In one example, an action specifier may be extracted from the edit decision list, and a corresponding action effect may be included in the composed media object, where the action effect is based upon the action specifier, and a time at which the action effect occurs in the composed media object is based upon a position of the action specifier in the edit decision list. The action specifier may be selected from the group consisting of a wipe right action, a wipe left action, wipe bottom action, a wipe top action, a wipe bottom action, and a title action.

In one example, a bundle definition may be extracted from the edit decision list, where the bundle definition includes a bundle name and an additional edit decision list. The bundle name may then be stored in association with the additional edit decision list, e.g., in a database or in a computer memory. A bundle name may be extracted from the (first) edit decision list, in which case an additional edit decision list may be retrieved from a database or memory based upon the bundle name; and the additional edit decision list may be processed as part of the first edit decision list, that is, as if the additional edit decision list had appeared in the first edit decision list at the point where the bundle name appears.

In one example, a network resource locator may be extracted from the (first) edit decision list, and a replacement edit decision list may be retrieved based upon the network resource locator. The replacement list may be retrieved from a web server using the locator, or from a database or a computer memory. The replacement list is then processed as part of the edit decision list as if the replacement list had appeared in the first edit decision list at the point where the locator appears.

In one example, a macro name may be extracted from the edit decision list, in which case a macro definition is selected, e.g., retrieved from computer memory or a database table, based on the macro name. The macro definition is then processed as part of the edit decision list, as if the definition had appeared in the first edit decision list at the point where the macro name appears.

In one example, a search string may be extracted from the media portion specifier, in which case a search engine is invoked to locate a search result based upon the search string. A "specified" media object is selected based upon the search result; and the "specified" media object is included in the composed media object as if it has been specified in the edit decision list at the point where the search string appears. The composed media object may be provided in a network response in response to the network request, or stored in a database or in a computer memory.

Figure 2:
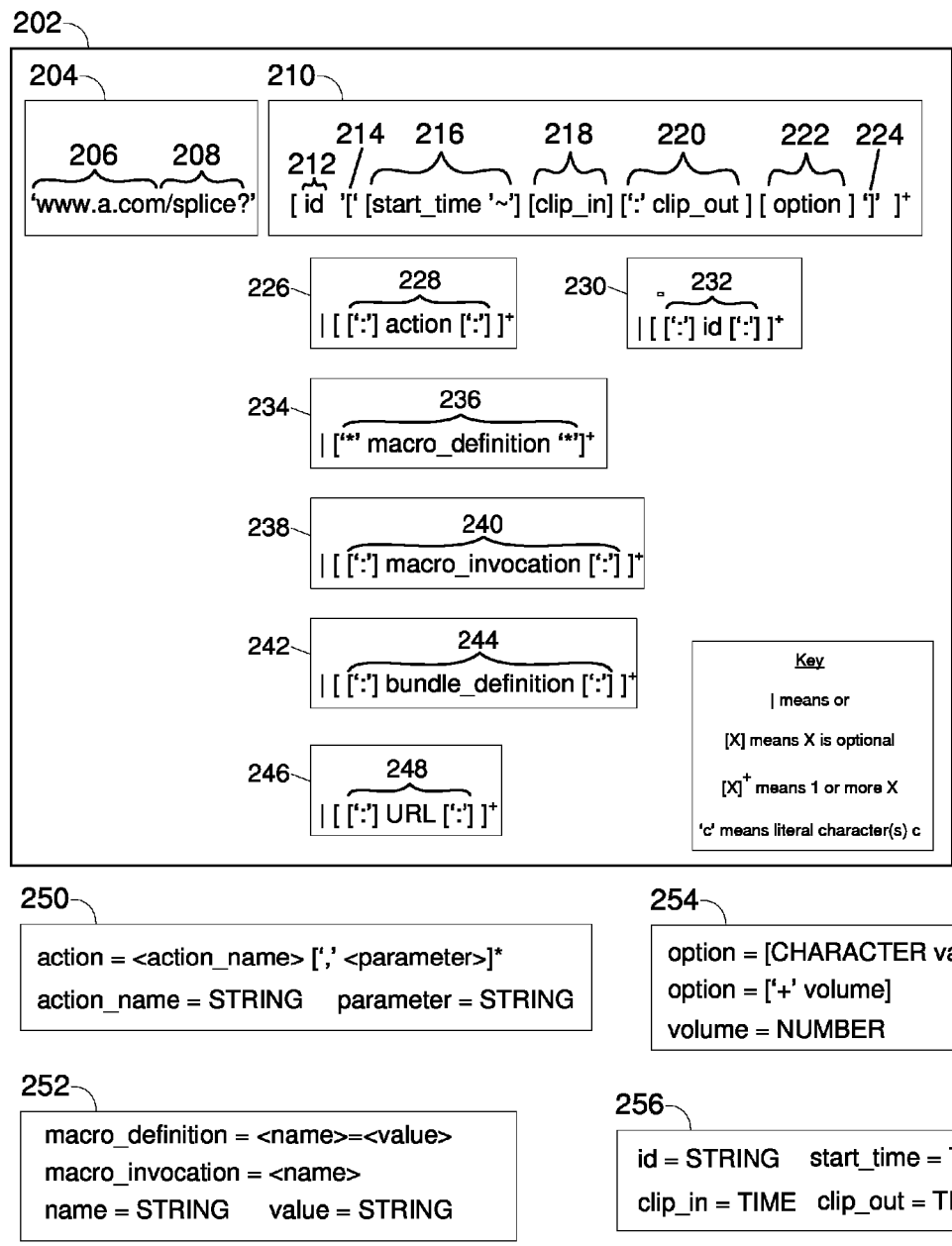
FIG. 2 illustrates a data format for a URL that contains an edit decision list in accordance with embodiments of the invention.

FIG. 2 illustrates a data format for a URL or URI that contains an edit decision list in accordance with embodiments of the invention. An edit decision list URL format 202 includes a network address 206 followed by a string 208 that identifies the URL as an edit decision list. In this example, the string 208 is "splice?". The string 208 is followed by a media portion specifier 210. The elements of the media portion specifier 210 include a media object identifier 210, an optional start time 216, an optional begin time 218, an optional end time 220, and an optional option specifier 222. The edit decision list URL 202 may also include an action specifier 228, a macro definition 236, a macro invocation 24, a bundle definition 244, an embedded URL 248, or a combination of those.

In one example, the start_time, if present, is followed by a special character, such as a tilde, to distinguish from other time values such as the begin and end times. The start time specifies the time relative to the beginning of the assembled video at which the media clip specified by the media portion specifier 210 is to start. A clip_in value 218 specifies a time relative to the beginning of the media clip from which the clip is to begin in the assembled video. A clip_out value 220 specifies a time relative to the beginning of the media clip at which the clip is to end in the assembled video. For example, the string video3251[1.20~5:10] specifies that a video clip with the identifier video3251 is to be added to the assembled video starting at time 1.20 relative to the beginning of the assembled video, and the portion of the clip that is to be added begins at time 5 relative to the beginning of the clip and ends at time 10.

The option specifier, if present, may be of the form "CHARACTER value", e.g., "'+'volume", where volume is a number, as shown in block 254. The option specifier provides for specification of an attribute that may affect the presentation of the media clip specified by the media object specifier 210. The character specifies a type of attribute, and the value specifies a value for the attribute. For example, the plus sign character '+' may specify an audio volume adjustment, and the value may specify a new value for the volume. An example is video3251[1:20~0:05:0:10+32], which indicates that the volume is to be set to 32% at the beginning of playback of the video325 clip during playback of an assembled video.

In one example, the action specifier 228 specifies that an action is to be performed during playback of the assembled video at the point where the action specifier 228 occurs in the edit decision list string. As block 226 illustrates, the action specifier may appear by itself, i.e., outside of any media portion specifier 210, between colons in an edit decision list string. For example, the string video1:wiperight:video2 specifies that video1 is to be presented, followed by a wiperight action that displays a transition effect of the screen being wiped, from left to right., followed by video2. The wiperight effect may create a transition between the end of video1 and the beginning of video 2. Other transitions or effects may be specified, e.g., wipe left, wipe top, wipe bottom, a title effect /t:title for setting a title that appears on the video display, and an effects code that specifies an effect by number, e.g., /e2 to cause effect number 2, which has a predefined meaning such as black and white.

A transition may be any transformation in which a first image, video, or sound is replaced with a second image, video, or sound over a time period. In one example, in a fading transition, the old image may fade out, and the new image may gradually fade in, i.e., appear. As another example, in the wiperight transition, a displayed image is replaced with a new image in a transformation in which an invisible vertical line passes from the left side of the image to the right side, and the old image is displayed to the right of the line, the viewable portion of the old image diminishing in area as the line moves to the right, while the new image is displayed to the left of the line expanding to the right, the viewable portion of the new image increasing in area as the line moves to the right. When the line reaches the right side of the region, the old image has been completely replaced in the region by the new image.

Abbreviations may be recognized, e.g., wr for wiperight, to reduce the length of the string, since URL strings are limited in length by some web browsers or web servers. Parameters may be included with the action, e.g., wr,2 or wr,2,5 to specify the parameters 2 and 5 to the wiperight action.

In one example, the media object identifier may appear with no modifiers, which indicates that the entire media object identified by the specifier is to be included in the assembled video. Block 230 shows that the media object identifier may appear by itself between colon characters or other separators.

A macro definition 236 allows a macro name to be defined for use in place of another string of characters. Block 234 shows that a macro definition may appear between colons or other separators. A macro definition is of the form name=value, as shown in block 252. For example, the macro definition ":wr=wr,2,5:" specifies that the string wr is to be replaced by wr,2,5 when the edit decision list is converted to an assembled video. In another example, different separator characters may be used in the macro definition, e.g., *wr=wr, 2,5*.

In one example, a macro invocation 240 is an appearance of the name of the macro in a string. A macro invocation may appear in a media portion specifier or between media portion specifiers, i.e., between colons, as shown in block 238. In both cases, the macro name will be replaced by the value assigned in the most recent macro definition for that name. The term replacement is used to indicate the concept of using a previously-defined value in place of a macro name, and is not meant to require that the string be modified by replacing the name with the value.

In some aspects, a bundle definition 244 is similar to a macro definition 236 and provides the same feature of associating a string value with a name. A bundle definition, like a macro definition, provides a way to create edit decision lists longer than 2048 characters by combining multiple shorter edit decision lists. A bundle definition 244 has the form <name>=<value>, where name is the name of a bundle, and value is a string that will replace the bundle name when the edit decision list URL that contains the name is translated to an assembled video. The bundle definition feature addresses the length limitation (e.g., the 2048 character limitation) on URL strings by permitting a string to refer to other strings by name. The other strings are referred to as bundles. For example, two bundles may be defined as b1=video123:wr and b2=video456[3:10]. Subsequent to those definitions, an edit decision list URL string b1:b2 is equivalent to video123:wr: video456[3:10].

In one example, a URL 248 may appear in an edit decision list URL. The URL 248 provides an alternative way to create edit decision lists longer than 2048 characters. The URL may refer to a web server object that has been previously defined as an edit decision list, and the previously-defined edit decision list will be substituted for the URL when the edit decision list that includes the URL is translated to an assembled video. The URL may differ from the bundle approach described above because an actual web request may be made to the URL when translating the edit decision list, thereby placing the mapping of URL's to values under the control of the web server that serves the URL. In one example, in the bundle approach, the mapping from bundle names to values is performed using a lookup table that is managed by the code or logic performing the translation to an assembled video.

In one example the edit decision list in URL format may be created and/or modified by a user via a text editor. The edit decision list is represented as a string, so modifications, e.g., to add clips, adjust the lengths of clips, and remove clips from the edit decision list, may be performed with a text editor, or with a simple computer program. Therefore, video editing may be performed on a mobile device or other device with relatively modest hardware resources.

In one example, using the edit decision list URL format, 100 clips may be included in an assembled video by a single edit decision list URL if the media portion specifier for each clip is up to 20 characters. In that case, 100 clips at 20 characters per clip would result in a string length of 2000 characters, which is less than the usual maximum URL length of 2048 characters imposed by web browsers and/or web servers.

Figure 3:
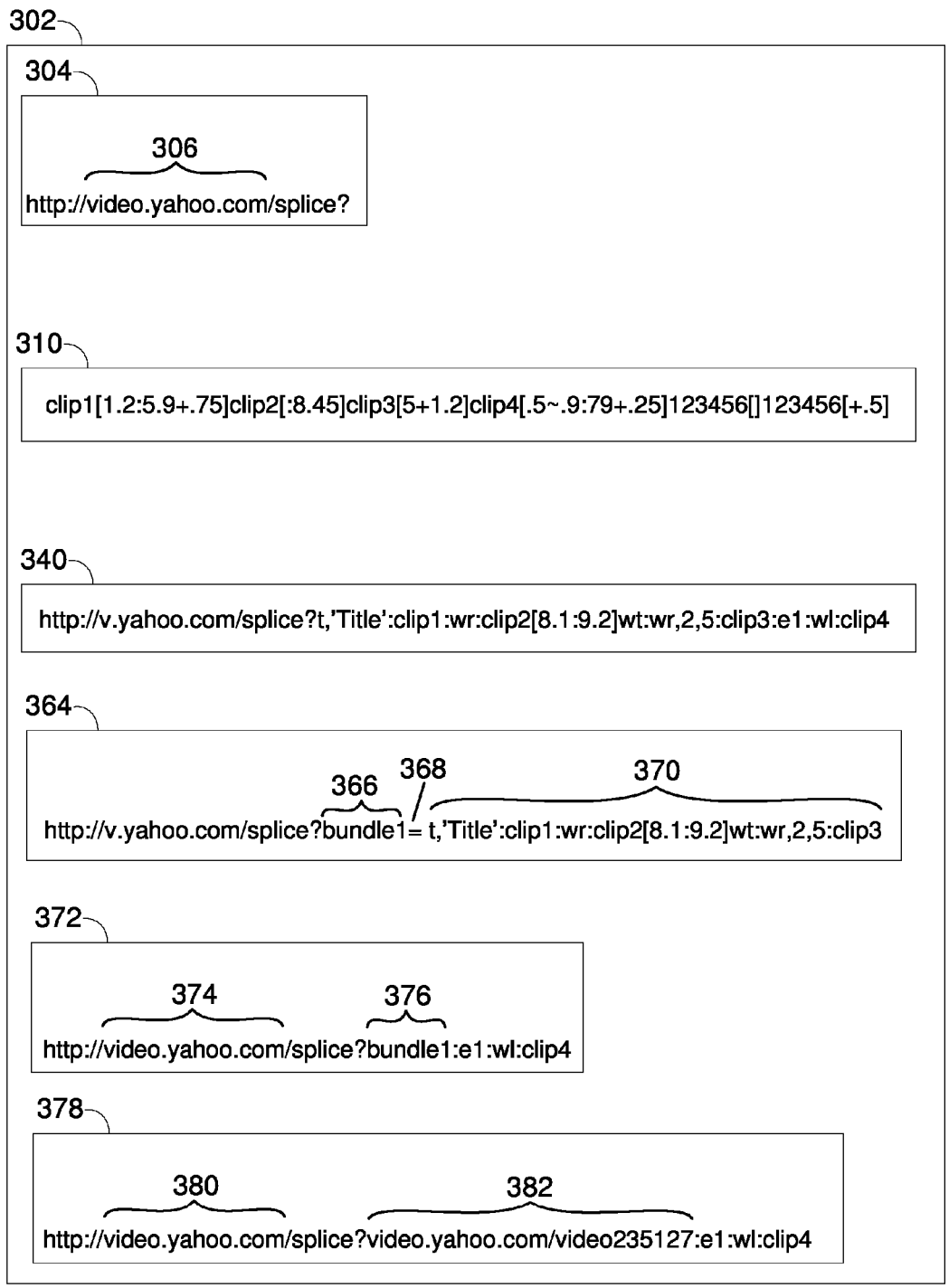
FIGS. 3 and 4 illustrate example URL's that contain edit decision lists in accordance with embodiments of the invention.

FIG. 3 illustrates example URL's that contain edit decision lists in accordance with embodiments of the invention. A URL prefix 304 with the value "http://video.yahoo.com/ splice?" is the first portion of an edit decision list URL, and specifies the network address of a server that is to translate the URL to an assembled media object. In this example, the network address is video.yahoo.com. The string "splice?" following the network address indicates that the URL is an edit decision list URL and is to be processed as described herein.

Block 310 shows a URL segment that follows the prefix 304. The URL segment is clip1[1.2:5.9+0.75]clip2[:8.45]clip3[5+1.2]clip4 [0.5~0.9:79+0.25]123456[ ]123456[+0.5]

This example includes six media portion specifiers, as described n the table below. The six media portion specifiers will be processed in order when the URL is translated to a video, e.g., when the URL is submitted to a web server that generates assembled videos for given edit decision list URL's. This URL is translated to an assembled video as follows. Note that if specifiers such as times or options are not included in the URL, then a reasonable default will be chosen. For example, if no start time is specified, then the start time will default to the end of the clip previously added, or 0 for the first clip. If no begin time (clip_in) is specified, the begin time defaults to the beginning of the clip. If no end time (clip_out) is specified, the end time defaults to the end of the clip.

1. clip1[1.2:5.9+0.75]—Add the portion of the video clip with the identifier clip1 beginning at time 1.2 and ending at time 5.9 in the clip to the assembled video at the beginning of the video, and set the volume to 75%.

2. clip2[:8.45]—Add a video clip with the identifier clip2 ending at time 8.45 in the clip to the assembled video after the previous clip.

3. clip3[5+1.2]—Add a video clip with the identifier clip3 starting at time 5 in the clip and continuing through the entire clip to the assembled video after the previous clip, and set the volume level to 120%.

4. clip4[0.5~0.9:79+0.25]—Add a video clip with the identifier clip4 at time 0.5 in the assembled video, starting at time 0.9 in the clip and continuing through the entire clip to the assembled video, and set the volume to 25%.

5. 123456[ ]—Add an entire video clip with the identifier 123456 to the assembled video after the previous clip.

6. 123456[+0.5]—Add an entire video clip with the identifier 123456 to the assembled video after the previous clip, and set the volume to 50%.

The edit decision list URL 340 shows another example:

http://v.yahoo.com/splice?t,'Title':clip1:wr:clip2[8.1:9.2]wt:wr,2,5:clip3:e1:w1:clip4

The URL 340 includes the following actions and media portion specifiers:

1. t,'Title'—Sets the title to 'Title'.

2. clip1—Add an entire video clip with the identifier clip1 to the assembled video after the previous clip (or at the beginning of the assembled video, if no previous clip).

3. wr—Execute a wipe right action 4. clip2[8.1:9.2]—Add the clip with the identifier clip2 beginning at time 8.1 and ending at time 9.2 in the clip to the assembled video after the previous clip 5. wt—Execute a wipe top action after the end of the previous clip 6. wr,2,5—Execute a wipe right action with the parameters 2 and 5 after the previous action 7. clip3—Add an entire video clip with the identifier clip3 to the assembled video after the previous clip 8. e1—Execute an effect action with the code 1 after the end of the previous clip 9. w1—Execute a wipe left action after the previous action.

10. clip4—Add an entire video clip with the identifier clip4 to the assembled video after the previous action An example bundle definition is shown in block 364:

http://v.yahoo.com/splice?bundle1=t,'Title':clip1:wr:clip2 [8.1:9.2]wt:wr,2,5:clip3

In this example, the bundle name is bundle1 and the bundle value is t,'Title':clip1:wr:clip2[8.1:9.2]wt:wr,2,5:clip3. After this URL has been requested, subsequent edit decision list URL's may refer to bundle1, e.g., :bundle1: or http://video.yahoo.com/splice?bundle1:e1:w1:clip4, and the name bundle1 will be replaced with the value t,'Title':clip1:wr:clip2[8.1:9.2]wt:wr,2,5:clip3.

An example URL reference embedded in an edit decision list URL is shown in block 378:

http://video.yahoo.com/splice?video.yahoo.com/video235127:e1:w1:clip4

In this example, the URL reference is video.yahoo.com/video235127. That reference will be replaced with the result of a web (e.g., HTTP) request executed for the URL video.yahoo.com/video235127.

Figure 4:
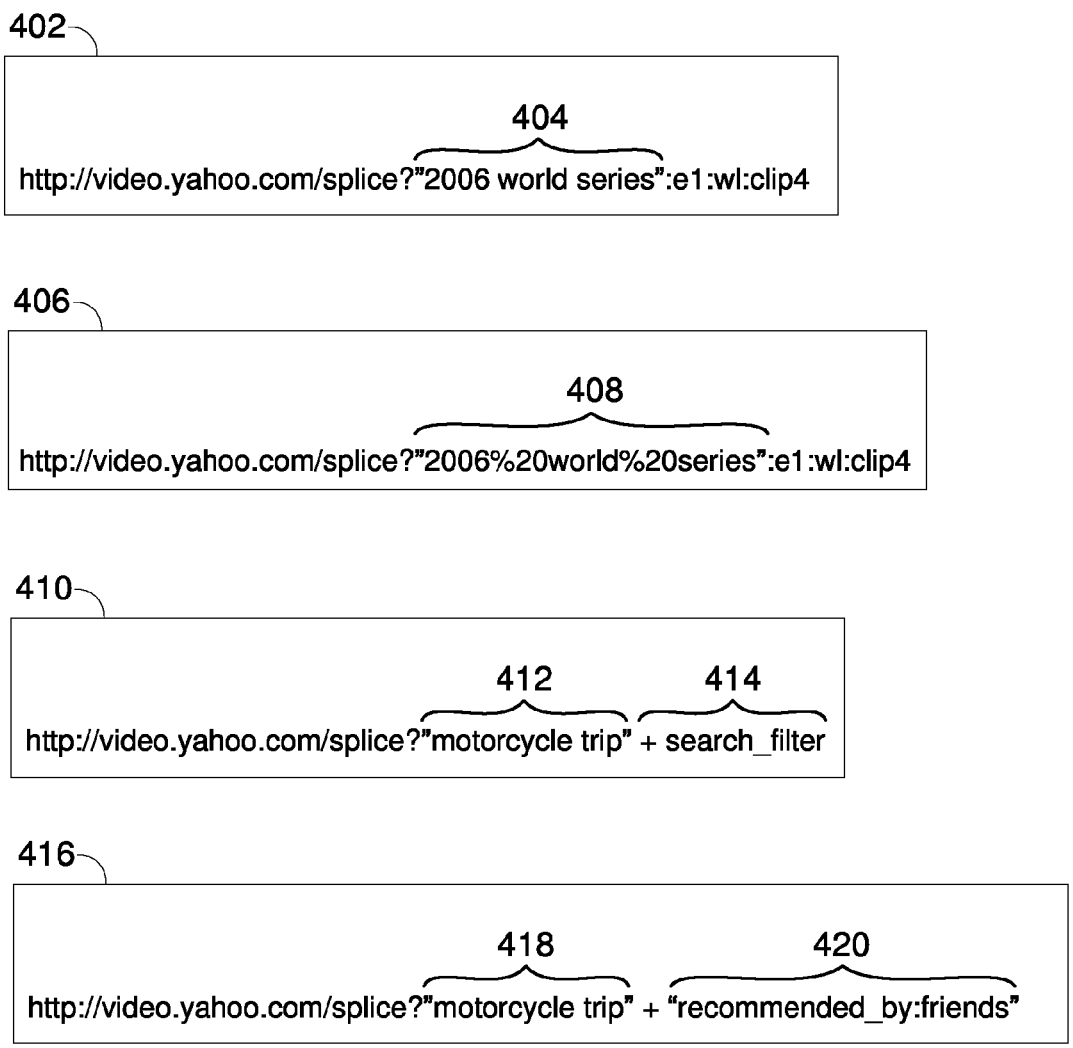

FIG. 4 illustrates example URL's that contain edit decision lists in accordance with embodiments of the invention. An example search specification is shown in block 402:

http://video.yahoo.com/splice?"2006 world series":e1:w1:clip4

In this example, the search string "2006 world series" appears in place of a media object identifier. When this example URL is translated to an assembled video, a web search will be performed using the string "2006 world series". One or more of the results will then be used as the media objects. For example, the search may be for videos, and one or more of the videos located by the search may be used as clips in the assembled video. The actions e1 and w1 will be applied as or after the clip finishes, and the clip clip4 will be displayed in the wipe left action and thereafter until the end of clip4.

Block 406 is similar to block 402, except that spaces are shown in URL-encoded format. The URL-encoded search string is: "2006%20world%20series":e1:w1:clip4.

A search query may include a search filter or additional search terms to reduce the number of search results. For example, block 410 shows the following URL http://video.yahoo.com/splice?"motorcycle trip"+search_filter The string represented by search_filter will be added to the search to narrow down the results. For example:, block 416 shows the following URL:

http://video.yahoo.com/splice?"motorcycle trip"+"recommended_by:friends"

In that example, the search results would be restricted to items that are recommended by friends. The "recommended by friends" may be a special instruction to the search engine to include recommendations in the search results, and in particular to include items recommended by people who are in the user's friends network.

Figure 5:
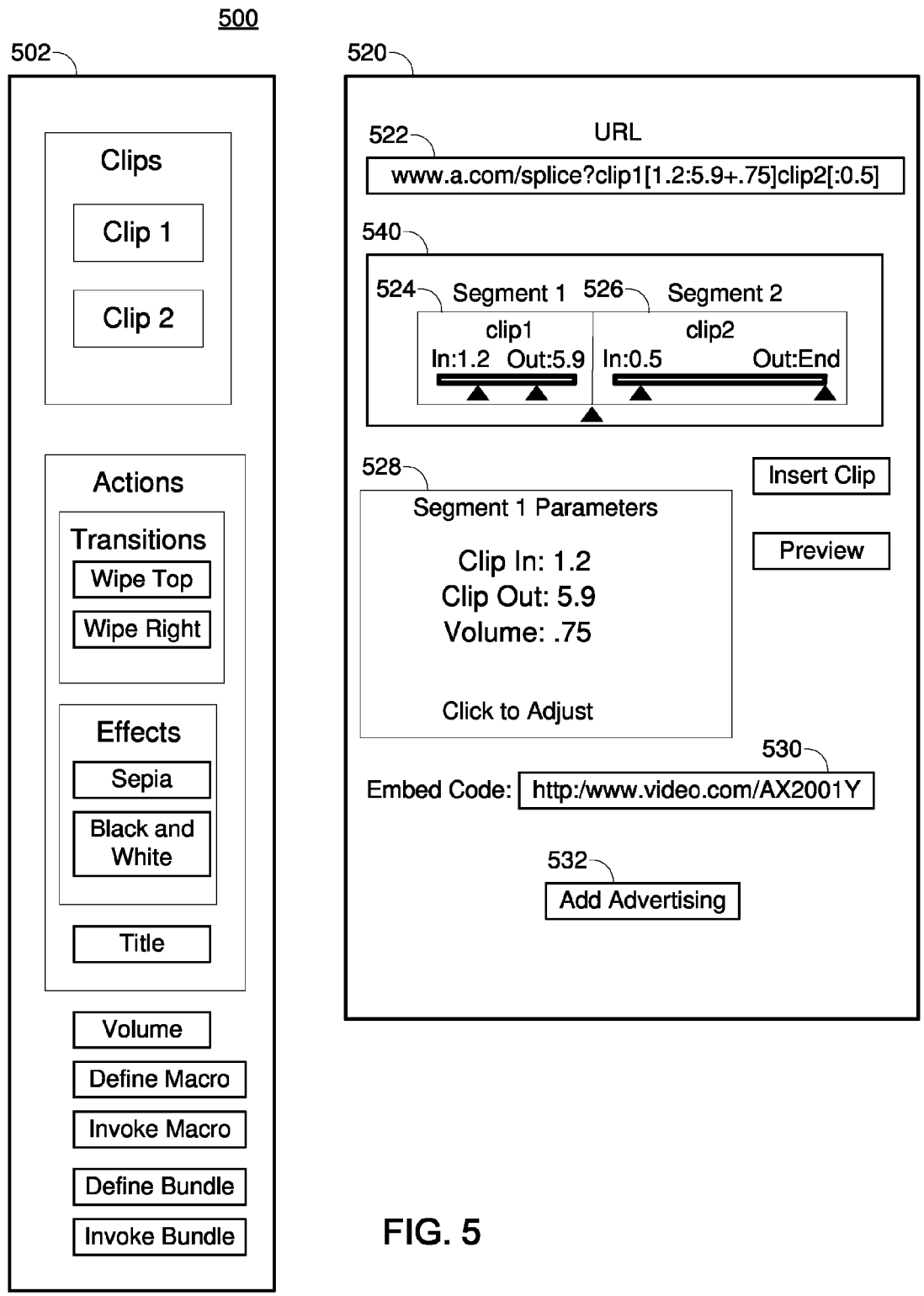
FIG. 5 illustrates a user interface for generating and modifying a URL that contains an edit decision list in accordance with embodiments of the invention.

FIG. 5 illustrates a user interface 500 for generating and modifying a URL 522 that contains an edit decision list in accordance with embodiments of the invention. The URL may be any type of network resource locator, such as a URI or other network address combined with an edit decision list. The user interface 500 includes a tool palette component 502 for selecting items to add to the edit decision list URL 522. The items include clips, e.g., Clip 1 and Clip 2, actions, e.g., wipe top, wipe right, and title, and effects, e.g., black and white. The tools also include a volume specifier, a macro definition, a macro invocation, a bundle definition, and a bundle invocation. A user may select one or more of these tools to add instructions for displaying or producing a selected clip, action, effect or the like to an edit decision list URL 522 result component. The URL 522 being constructed by the user interface 500 appears in the box labeled URL 522 in a URL construction portion 520 of the user interface 500. The user may use a copy command, e.g., a copy to clipboard command provided by the computer's operating system to copy the URL value from the URL 522. The user may then paste the URL value into a web browser or other application.

A representation 540 of the segments of the URL is also shown. A media object representation component 540 includes one or more user interface controls that correspond to the one or more segments defined by the URL 522. In the example media object representation component 540, a first segment labeled Segment 1 corresponds to clip 1, and a first segment user interface component 524 is shown adjacent to a Segment 1 label. The component represents clip 1 and include a time slider with begin and end arrows for adjusting the begin and end times of the segment. That is, the arrows can be moved right or left to adjust the begin (In) and end (Out) times of the segment. A second segment labeled Segment 2 corresponds to clip 2 and a second user interface component is shown for adjusting the begin and end times of the second segment. Additional clips may be added to create additional segments by selecting an Insert Clip button, and the assembled video may be viewed by pressing a Preview button. Parameters and options for the segment are displayed in a Segment Parameters interface component 528. In one example, a user may adjust each parameter value by clicking on or selecting the value.

An embed code may be displayed in an embed code component 530. The embed code is, for example, a URL or other network resource locator for the assembled video, and the video may be embedded in, i.e., linked to from, other web pages that include a link to the embed code.

The URL construction portion 520 also includes an Add Advertising component 532, which includes a button that, when selected, adds one or more advertisement media objects (e.g., videos) to the edit decision list URL. In one example, the advertisement media objects are selected from a predefined list of advertising media, and one or more of the advertising media objects are added to the URL string 522, e.g., as media object identifiers that identify the advertising media objects. In one example, each advertising object is associated with an attribution value that indicates the owner of the advertisement, and each non-advertising object is also associated with an attribution value that indicates the creator or owner of the non-advertising object. Therefore, when an edit decision list URL 522 string is converted to a video (or other media object) for display, or when a video created from an edit decision list URL is displayed, the information in the edit decision list URL 522, i.e., the running times of each clip specified in the list, can be used to compute a revenue share among the contributors of the non-advertising clips. The revenue sharing information may either be received at creation time (e.g., if the clip or assembled video has been dynamically created or edited on a client device) or prior to delivery to a client, e.g., when the assembled media object is stored in a database. The revenue share calculation may use the percentage of play time of a given clip relative to the overall length of the composite work (i.e., the assembled media object), and apply the percentage to any revenue that may be sharable by the creators of clips in the assembled media object. In one example, the corresponding dollar amount may be credited to the contributor's account. The clip contributors would sign up for revenue sharing accounts and authorize such uses for the content they contribute. Other forms of payment may be used as alternatives to dollar amounts. In one example, any form of legal consideration may be used.

Figure 6:
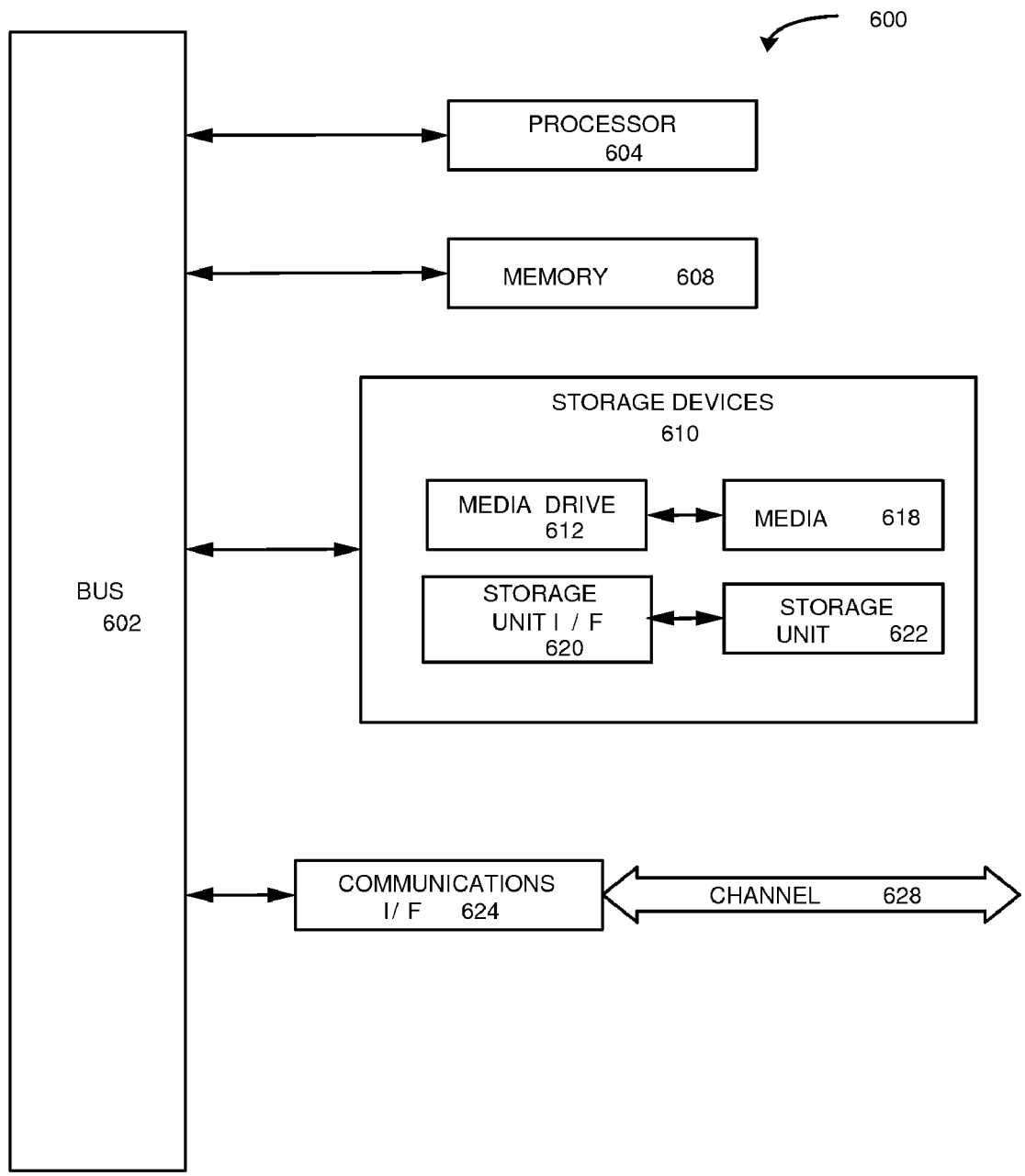
FIG. 6 illustrates an exemplary computer system that may be used in accordance with some embodiments of the invention.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention. FIG. 6 is an illustrative drawing of an exemplary computer system that may be used in accordance with some embodiments of the invention. FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A non-transitory computer-readable storage medium comprising instructions for generating an edit decision list that specifies media content to be included in a composed media object, the instructions for:
   generating, by a computer, at least one media portion specifier, such that
      the at least one media portion specifier identifies at least a portion of at least one first media object, and such that
      the at least one media portion specifier additionally comprises at least one option specifier, such that the at least one option specifier, comprises a volume level specifier;
   generating, by the computer, the edit decision list, the edit decision list includes a network address and the at least one media portion specifier, and such that
      the edit decision list includes an action specifier that specifies an action comprising a visual effect to be included in the composed media object, such that a time at which the action occurs in the composed media object is based on a position of the action specifier in the edit decision list; and
   the edit decision list is in the form of a network resource locator string suitable for transmission in a network request to the network address to cause the composed media object to be generated.

2. The computer-readable medium of claim 1, further comprising:
   transmitting a single Hypertext Transfer Protocol request to the network address, such that the request includes the edit decision list in a resource specifier.

3. The computer-readable medium of claim 1, such that the network resource locator comprises a Uniform Resource Locator, Uniform Resource Identifier, Uniform Resource Name, or a combination thereof.

4. The computer-readable medium of claim 1, such that the network request is selected from the group consisting of a Hypertext Transfer Protocol request message, a web service request message, and a Real-Time Messaging Protocol message.

5. The computer-readable medium of claim 1, such that wherein the at least one media portion specifier comprises a media object identifier that identifies the at least one first media object.

6. The computer-readable medium of claim 1, such that the at least one media portion specifier comprises a start time that identifies a position of the start of the at least one media portion in the composed media object relative to the beginning of the composed media object.

7. The computer-readable medium of claim 1, such that the at least one media portion specifier comprises a begin time that identifies a begin time of the at least one media portion in the at least one first media object relative to the beginning of the first media object.

8. The computer-readable medium of claim 1, such that the at least one media portion specifier comprises an end time that identifies an end time of the at least one media portion in the at least one first media object relative to the beginning of the first media object.

9. The computer-readable medium of claim 1, such that the visual effect comprises a transition.

10. The computer-readable medium of claim 1, such that the edit decision list includes at least one bundle definition, such that the bundle definition includes a name and at least one replacement edit decision list to be associated with the name, such that the name is to be replaced with the at least one replacement edit decision list in response to translation of at least one subsequent edit decision list to at least one composed media object.

11. The computer-readable medium of claim 1, such that the edit decision list includes at least one bundle name, such that the bundle name is to be replaced with at least one replacement edit decision list when the composed media object is generated.

12. The computer-readable medium of claim 1, such that the edit decision list includes at least one embedded network resource locator, and the embedded network resource locator is to be translated to at least one replacement edit decision list referred to by the embedded network resource locator when the composed media object is generated.

13. The computer-readable medium of claim 1, such that the edit decision list includes at least one macro name, the at least one macro name identifies at least one macro definition, and the macro name is to be replaced with the macro definition when the composed media object is generated.

14. The computer-readable medium of claim 1, such that the at least one media portion specifier comprises at least one search string, the at least one search string to be used with a search engine to select the at least one first media object based upon results of a web search.

15. The computer-readable medium of claim 14, such that the at least one first media object is selected from at least one search result generated by the search engine for the at least one search string.

16. A non-transitory computer-readable medium comprising instructions for generating media content to be included in a composed media object, the instructions for:
receiving, by a computer, a request from a network client, such that the request includes an edit decision list, and the edit decision list includes at least one media portion specifier and an action specifier that specifies an action comprising a visual effect to be included in the composed media object, such that a time at which the action occurs in the composed media object is based on a position of the action specifier in the edit decision list;
extracting, by the computer, the at least one media portion specifier from the edit decision list, such that the at least one media portion specifier identifies at least a portion of at least one first media object and such that the at least one media specifier further includes at least one option specifier comprising a volume level specifier;
generating, by the computer, the composed media object, such that the composed media object includes the at least a portion of at least one first media object and the visual effect;
extracting, by the computer, the at least one option specifier from the at least one media portion specifier;
extracting, by the computer, at least one action specifier from the edit decision list; and
including, by the computer, visual effect in the composed media object.

17. The computer-readable medium of claim 16, such that the edit decision list is received in a single Hypertext Transfer Protocol request that includes the edit decision list in a resource specifier.

18. The computer-readable medium of claim 16, further comprising:
extracting a media object identifier from the at least one media portion specifier; selecting the at least one first media object based upon the media object identifier; and including the at least a portion of at least one first media object in the composed media object.

19. The computer-readable medium of claim 16, further comprising appending the at least a portion of at least one first media object to the composed media object if no start time is specified in the at least one media portion specifier.

20. The computer-readable medium of claim 16, further comprising:
extracting a specified start time from the at least one media portion specifier; and
including the at least a portion of at least one first media object in the composed media object at the specified start time in the composed media object relative to the beginning of the composed media object.

21. The computer-readable medium of claim 16, further comprising:
extracting a specified begin time from the at least one media portion specifier; and
including the at least a portion of at least one first media object in the composed media object, such that the at least a portion of at least one first media object begins at the specified begin time in the at least one first media object relative to the beginning of the at least one first media object.

22. The computer-readable medium of claim 16, further comprising:
extracting a specified end time from the at least one media portion specifier; and
including the at least a portion of at least one first media object in the composed media object, such that the at least a portion of at least one first media object ends at the specified end time in the at least one first media object relative to the beginning of the first media object.

23. The computer-readable medium of claim 16, such that the visual effect comprises a transition.

24. The computer-readable medium of claim 23, such that the transition is selected from the group consisting of a wipe right action, a wipe left action, a wipe top action, and a title action.

25. The computer-readable medium of claim 16, further comprising:
  extracting at least one bundle definition from the edit decision list, such that the at least one bundle definition includes at least one bundle name and at least one additional edit decision list; and
  storing the at least one bundle name in association with the at least one additional edit decision list.

26. The computer-readable medium of claim 16, further comprising:
  extracting at least one bundle name from the edit decision list;
  retrieving at least one additional edit decision list based upon the at least one bundle name; and
  processing the at least one additional edit decision list as part of the edit decision list.

27. The computer-readable medium of claim 16, further comprising:
  extracting at least one network resource locator from the edit decision list;
  retrieving at least one replacement edit decision list based upon the network resource locator; and
  processing the at least one replacement edit decision list as part of the edit decision list.

28. The computer-readable medium of claim 16, further comprising:
  extracting at least one macro name from the edit decision list;
  selecting at least one macro definition based on the at least one macro name; and processing the at least one macro definition as part of the edit decision list.

29. The computer-readable medium of claim 16, further comprising
  extracting at least one search string from the at least one media portion specifier; invoking a search engine to locate at least one search result based upon the search string; selecting at least one specified media object based upon the at least one search result; and including the at least one specified media object in the composed media object.

30. The computer-readable medium of claim 16, further comprising:
  retrieving at least one stored string from a computer memory, such that the at least one stored string is associated with an attribute that specifies at least one position in the edit decision list to which the at least one stored string is to be added; and processing the at least one stored string as a component of the edit decision list that begins at the at least one position in the edit decision list.

31. An apparatus for generating an edit decision list that specifies media content to be included in a composed media object, the apparatus comprising at least one computing device comprising one or more processors programmed to execute software code retrieved from a computer readable storage medium storing software for a method comprising the steps:
  generating, using the at least one computing device, at least one media portion specifier, such that the at least one media portion specifier identifies at least a portion of at least one first media object, and such that the at least one option specifier additionally comprises a volume level specifier;
  generating, using the at least one computing device, the edit decision list, such that the edit decision list includes a network address and the at least one media portion specifier and such that the edit decision list includes an action specifier that specifies an action comprising visual effect to be included in the composed media object, such that a time at which the action occurs in the composed media object is based on a position of the action specifier in the edit decision list; and
  such that the edit decision list is in the form of a network resource locator string suitable for transmission in a network request to the network address to cause the composed media object to be generated.

32. The apparatus of claim 31, such that the method further comprises the step of:
  transmitting, using the at least one computing device, a single Hypertext Transfer Protocol request to the network address, such that the request includes the edit decision list in a resource specifier.

33. The apparatus of claim 31, such that the network resource locator comprises a Uniform Resource Locator, Uniform Resource Identifier, Uniform Resource Name, or a combination thereof.

34. The apparatus of claim 31, such that the at least one media portion specifier comprises a media object identifier that identifies the at least one first media object.

35. The apparatus of claim 31, such that the at least one media portion specifier comprises a begin time that identifies a begin time of the at least one media portion in the at least one first media object relative to the beginning of the first media object.

36. An apparatus for generating media content to be included in a composed media object, the apparatus comprising at least one computing device comprising one or more processors programmed to execute software code retrieved from a computer readable storage medium storing software for a method comprising the steps:
  receiving, using the at least one computing device, a request from a network client, such that the request includes an edit decision list, and the edit decision list includes at least one media portion specifier and an action specifier that specifies an action comprising a visual effect to be included in the composed media object, such that a time at which the action occurs in the composed media object is based on a position of the action specifier in the edit decision list;
  extracting, using the at least one computing device, the at least one media portion specifier from the edit decision list, such that the at least one media portion specifier identifies at least a portion of at least one first media object and further includes at least one option specifier comprising a volume level specifier;
  extracting, using the at least one computing device, at least one action specifier from the edit decision list; and
  generating, using the at least one computing device, the composed media object, such that the composed media object includes the at least a portion of at least one first media object; and
  including, using the at least one computing device, at least one visual effect in the composed media object.

37. The apparatus of claim 36, such that the edit decision list is received in a single Hypertext Transfer Protocol request that includes the edit decision list in a resource specifier.

38. The apparatus of claim 36, such that the method further comprises the steps of:
  extracting, using the at least one computing device, a media object identifier from the at least one media portion specifier; logic for selecting the at least one first media object based upon the media object identifier; and
  including, using the at least one computing device, the at least a portion of at least one first media object in the composed media object.

39. The apparatus of claim 36, further comprising logic for appending the at least a portion of at least one first media object to the composed media object if no start time is specified in the at least one media portion specifier.

40. The apparatus of claim 36, the method further comprising the steps of extracting, using the at least one computing device, a specified begin time from the at least one media portion specifier; and including, using the at least one computing device, the at least a portion of at least one first media object in the composed media object, wherein the at least a portion of at least one first media object begins at the specified begin time in the at least one first media object relative to the beginning of the at least one first media object.

* * * * *